FIG. 2.

Oct. 9, 1945.  C. M. YODER  2,386,533
UNCOILING MECHANISM
Filed Nov. 27, 1941  8 Sheets-Sheet 4

INVENTOR.
CARL M. YODER.
BY
ATTORNEY.

Oct. 9, 1945.　　　　　C. M. YODER　　　　　2,386,533
UNCOILING MECHANISM
Filed Nov. 27, 1941　　　　8 Sheets-Sheet 5

INVENTOR.
CARL M. YODER.
BY Geo. B. Pitts
ATTORNEY.

Oct. 9, 1945.  C. M. YODER  2,386,533
UNCOILING MECHANISM
Filed Nov. 27, 1941  8 Sheets-Sheet 6

INVENTOR.
CARL M. YODER.
BY
ATTORNEY.

Oct. 9, 1945.　　　C. M. YODER　　　2,386,533
UNCOILING MECHANISM
Filed Nov. 27, 1941　　　8 Sheets-Sheet 8

INVENTOR
CARL M. YODER
BY
ATTORNEY

Patented Oct. 9, 1945

2,386,533

UNITED STATES PATENT OFFICE 2,386,533

UNCOILING MECHANISM

Carl M. Yoder, Lakewood, Ohio; Bertha L. Yoder executrix of said Carl M. Yoder, deceased Application November 27, 1941, Serial No. 420,639

23 Claims. (Cl. 242—78)

This invention relates to apparatus for uncoiling sheet material for feeding to a processing or other type of mechanism.

One object of the invention is to provide an improved mechanism for supporting a coil of sheet material, uncoiling it and delivering the material to a processing mechanism or direct to a fabricating means, whereby danger of coil breaks during uncoiling is eliminated; such improved mechanism being advantageous for use in uncoiling sheet material as it comes from the mill.

Another object of the invention is to provide an improved uncoiling mechanism for sheet metal, wherein is provided guides related to a pair of feed rolls and the support for the coil is automatically moved to maintain that portion of the coil from which the material uncoils, in a substantially predetermined relation to the guides.

Another object of the invention is to provide an improved sheet metal uncoiling mechanism adapted to be related to a machine for operating on the sheet metal, and having guide means leading from the coil of material to feed rolls of the operating machine shaped and arranged to prevent coil breaks or the development of strains in the sheet metal during uncoiling.

Other objects of the invention will be apparent to those skilled in the art to which my invention relates from the following description taken in connection with the accompanying drawings, wherein:

In the drawings, 1 indicates as an entirety a mechanism for supporting the coil in such manner that the contiguous portions thereof during uncoiling leave the coil and engage with guide means, indicated as an entirety at 2, without undue strain or distortion, so that coil breaks or strains in the material do not occur between the coil and the means or machine to which it is delivered, for example, a processing mechanism indicated as an entirety at 3, mounted on the frame 1'.

In the form of coil supporting means 1 herein shown, 5 indicates a pair of tracks on which is slidably mounted a cradle 6 adapted to receive a coil of sheet metal A. The coil may be delivered to the cradle by means of an overhead crane or by rolling it down an inclined wall 7. To permit of the delivery of the coil A, the guide means 2 (later referred to) are moved to an inoperative position, as shown in dotted lines in Fig. 2. The cradle 6 is provided with spaced longitudinally extending walls 8 for supporting two series of inwardly and downwardly inclined, transversely arranged shafts on which rollers 9 are loosely mounted, to permit the coil to be readily moved endwise on the cradle, when desired.

Figure 3:
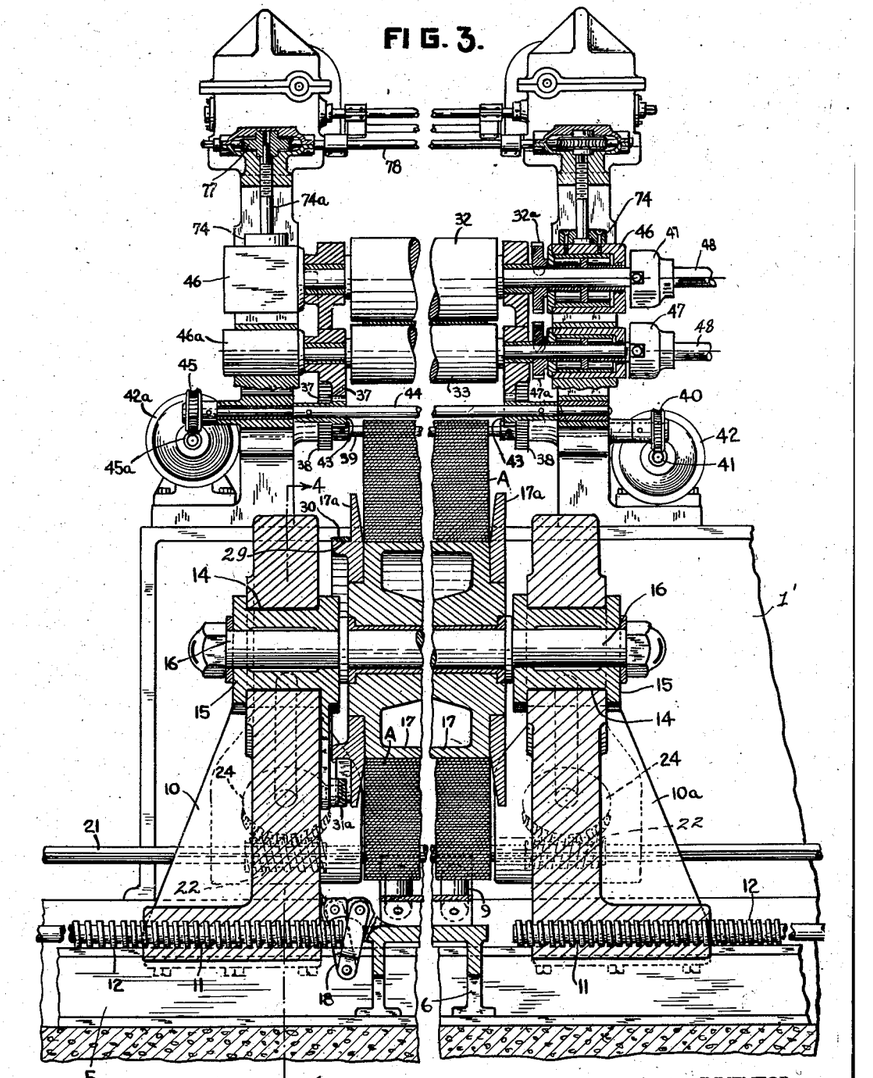
Fig. 3 is a section on the line 3—3 of Fig. 2.

10, 10a, indicate a pair of standards slidable on the tracks 5. The standards are provided with bosses having through openings 11 provided with screw threads, which are engaged by feed screws 12 (see Fig. 3). Each screw 12 is mounted in bearings 12a mounted on a base 13a (see Fig. 1) and drivingly connected to the shaft of a motor 13 suitably secured to the base, whereby each standard 10, 10a, may be moved along the tracks 5 in either direction independently of the other standard to permit a coil to be positioned on and between the standards and coils of different widths alined with the guide means 2. The upper portions of the standards 10, 10a, are formed with alined ways 14 to slidably support blocks 15. The ways 14 are inclined at an angle of approximately 45 degrees for a purpose later set forth. Each block 15 supports a spindle 16, alined with the spindle supported by the other block, and each spindle rotatably supports a drum 17, adapted to be projected axially into one end of a coil A. The inner end of each drum 17 is preferably conically shaped to facilitate its engagement with the coil (see Fig. 1) and its outer end is provided with a circumferential flange 17a. When a coil A is to be positioned on the standards 10, 10a, the blocks 15 are moved to the lower ends of the ways 14 and the standard 10 is moved away from the standard 10a by operation of the adjacent feed screw 12 (toward the left as viewed in Fig. 1).

The cradle 6 is connected to the standard 10 by a flexible member, such as a plurality of links 18, so that the cradle will be carried along with the standard, after the latter has moved a predetermined distance, whereby the coil may be readily positioned on the cradle. A coil is then positioned on the cradle 6. Next, the standard 10 is moved on the tracks 5, toward the right, by operation of the adjacent feed screw 12, such movement serving to effect first engagement of the adjacent drum 17 with the coil and the standard with the cradle and then movement of the coil and cradle until the opposite end of the coil engages with the other drum 17. The standards 10, 10a, may then be simultaneously moved in either direction by operation of both feed screws 12, to aline the coil with the guide means 2. The blocks 14 are then moved upwardly to position the coil for uncoiling in relation to the guide means, as later set forth.

The blocks 15 are propelled or moved longitudinally of the ways 14 downwardly and upwardly by a power mechanism, indicated as an entirety at 19, the operation of which in the upward direction during uncoiling of the material is automatically controlled, as later set forth, so that the contiguous portions of the coil, in unwinding therefrom, have substantially the same relation to the remaining coil convolutions and the guide means 2 throughout the entire length of the material, to avoid danger of coil breaks. Of the power mechanism 19, 20 indicates a motor for driving a shaft 21, which extends through the standards 10, 10a, and is preferably coextensive in length to the tracks 5 and provided with and splined to two worms 22. Each worm 22 is held against endwise movement relative to the adjacent standard by suitable bushings 22a fixedly mounted in an opening in the standard for the shaft 21 (see Fig. 5). A casing member 23 co-operates with a recessed portion of the adjacent standard (see Figs. 4 and 5) to enclose a worm gear 24, which meshes with the adjacent worm 22. Each worm gear 24 is fixed to a bushing splined to the shank end 25 of a feed screw 25a, which has threaded engagement with a sleeve 26 fixedly mounted in and extending through the adjacent standard in alinement with the way 14. The inner end of the feed screw 25a is provided with a head 27 which rotatably fits a socket 27a carried by the lower end of the adjacent block 15, so that endwise movement of the screw resulting from its rotation moves the block in the way upwardly or downwardly according to the direction of rotation of the screw. The bushing for the gear 24 is enlarged at its inner end portion to rotatably fit the lower end of the sleeve 26 and its inner end is provided with a flange which engages with the wall of the standard surrounding the sleeve. The hub of the gear 24 rotates in a bearing 28 provided in the casing member 23 and is provided with a circumferential shoulder which engages the end wall of the bearing, whereby the gear rotates between and is held against endwise movement by the bearing 28 and walls of the standard. Accordingly, rotation of the gear 24 will effect endwise movement of the screw 25a in one direction or the other. As the shaft 21 is provided with two worms 22, each engaging one of the gears 24, it will be seen that the blocks 15 are simultaneously moved in either direction. The movement of the blocks 15 upwardly is controlled automatically, as later set forth, to maintain that portion of the coil, which becomes or constitutes its outer convolution as uncoiling continues and from which the material leaves the coil, in substantially a predetermined relation to the receiving end of the guide means 2; but supplemental to such control means, a separate circuit and a switch therefor (later referred to) are provided to operate the motor independently of such control, whereby the blocks 15 may be moved in the downward direction into position to receive a coil preparatory to uncoiling thereof. One of the drums 17, (preferably the drum mounted on the standard 10), is provided outwardly of its flange 17a, with a concentric wall 29, with which a suitable brake band 30 engages, one end of the band being fixed to a pin 31 on the inner side of the standard (see Fig. 4) and the other end of the band being connected to a foot lever 31a, also pivoted on the inner side of the standard (see Fig. 4). The braking means may be employed to hold the coil A stationary or to retard its uncoiling; devices (not shown) may be employed to lock or hold the foot lever in any desired adjusted position, for example, as shown in Letters Patent No. 2,139,873, dated Dec. 13, 1938, to which reference may be made.

Figure 2:
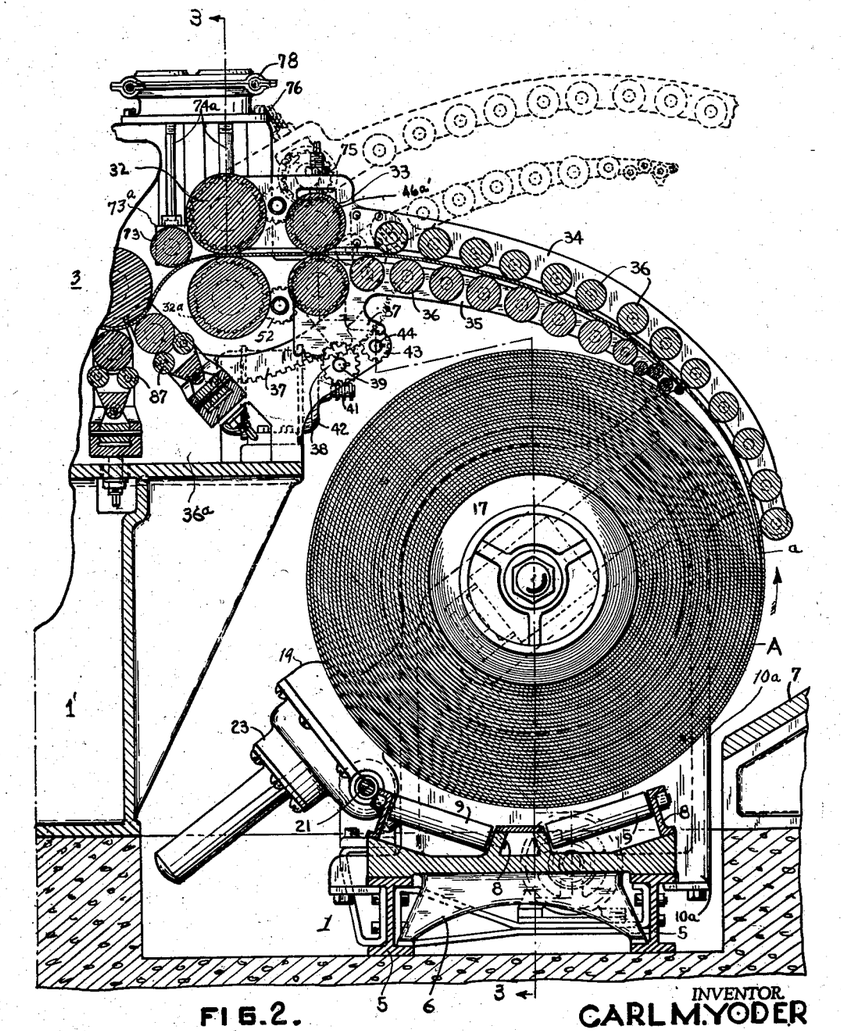
Fig. 2 is a section on the line 2—2 of Fig. 1, enlarged.
Figure 4:
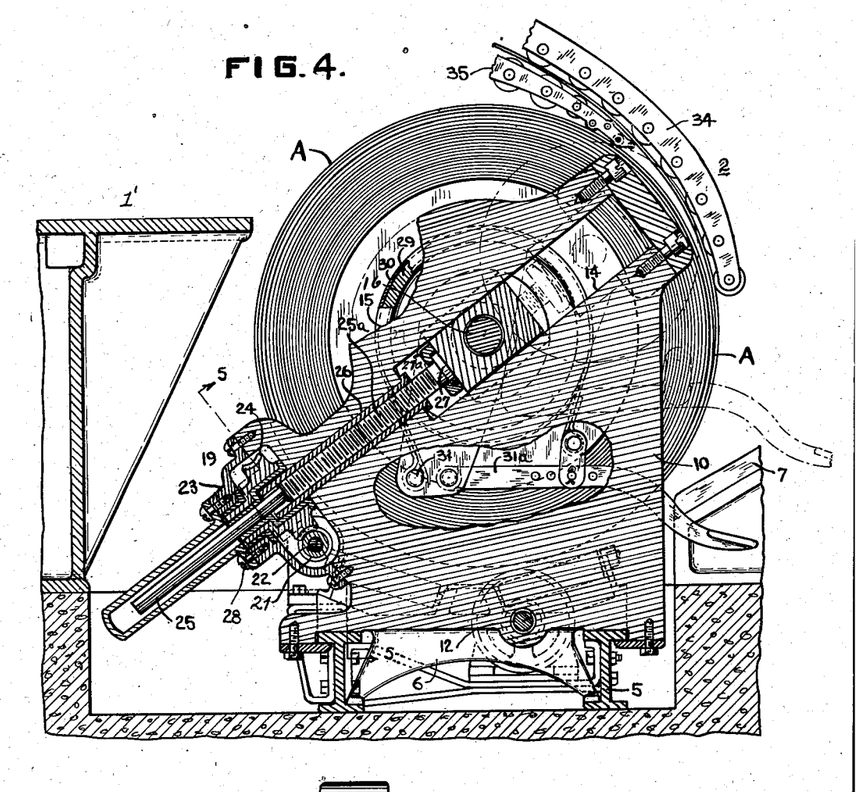
Fig. 4 is a section on the line 4—4 of Fig. 3.

The guide means 2 are constructed and arranged to guide and convey the material from the coil, as it unwinds therefrom, to one or more pairs of rolls 32, 33, for feeding the material to the working or other mechanism 3. The guide means 2 is of substantially arc or curvilinear shape, so that the material, as it moves from the coil to the feed rolls is gradually transformed from a curvilinear shape to substantially a rectilinear shape to eliminate danger of coil breaks and strains in the material during uncoiling. This form of guide means permits coils A of different diameters to be positioned and readily uncoiled. As shown in Figs. 2 and 4, the receiving end of the guide means 2 is related to that side of the coil from which the material unwinds and the ways 14 for the blocks 15, when the latter are moved upwardly by the operating or power means 19, guide the coil in a direction at an angle to a plane tangential to the point at which the material leaves the coil (see line x in Fig. 6), so that these operating means and the control means therefor co-operate with the guide means to insure a substantially uniform unwinding relation between the coil and the guide means without imparting strains upon the material.

Of the guide means 2, 34 indicates a pair of spaced upper arms pivotally mounted on the frame 1', preferably on the shaft for the upper feed roll 32. 35 indicates a pair of spaced lower arms pivotally mounted on the frame 1', preferably on the shaft for the lower feed roll 33. Each pair of arms 34, 35, carries between them a set or series of freely rotatable rollers 36, those rollers of one series being preferably in staggered relation to the rollers of the other series and forming between them a combined guide and conveyor for the material. As will be noted from the drawings, the arms 34—34, 35—35, have a curvilinear shape from end to end, the curvature being greater at their outer end portions and decreasing toward their inner ends; that is, contiguous portions of the arms of each pair are disposed on different radii which progressively increase in length toward the feed rolls 32, 33. Accordingly, the rolls 36 of the respective sets are arranged so that the curvature of the sheet metal, due to its coiled relation, is gradually removed to prevent development of kinks, strains or coil breaks in any portion of the material during delivery thereof to the feeding rolls 33. As will also be noted, the upper pair of arms 34 and rolls 36 carried thereby extend beyond the lower pair of arms, so that the material may be guided from the point beyond where it leaves the coil to the path defined by the two series of rolls 36. The rolls 36 of each series are provided at their opposite ends with pins which rotate in the adjacent arms and connect the latter together for bodily movement to and from an inoperative position. Each arm of each pair is provided with an arcuate rack 37, the racks 37 for the arms 34 being in mesh with gears 38 fixed to a shaft 39. The shaft 39 is provided with a worm gear 40, in mesh with a worm 41, fixed to the shaft of a motor 42. The racks 37 fixed to the arms 35 mesh with gears 43, fixed to a shaft 44, which in turn is provided with a worm gear 45 in mesh with a worm 45a fixed to the shaft of a motor 42a. The shafts 39 and 44 are mounted in suitable bearings provided in spaced housings or side members 36a, which support the mechanism 3. The motors 42, 42a, through the gearings just described, serve to swing the pairs of arms 34, 35, upwardly, as shown in dotted lines in Fig. 2, and downwardly.

The feed rolls 32, 33, are mounted as follows: the shafts for the rolls 32, 32, are mounted in bearing boxes 46 positioned in openings in the side members 36a, the upper boxes being adjustable as later set forth. The shaft for the lower roll 33 is mounted in suitable bearing boxes 46a supported in the side members 36a, whereas the shaft for the upper roll 33 is mounted in suitable bearing boxes, which are adjustably mounted in openings 46a' formed in the arms 34 (see Fig. 2). The shaft for each of the rolls 32 is extended at one end and connected through universal joints 47 to a shaft 48 suitably mounted in the walls of a casing 49. The shafts 48 are driven through suitable gearing in the casing 49 by the shaft 107a of a motor 107. The shaft for each roll 32 is provided with a gear 32a in mesh with a pinion 52 which meshes with a gear 47a on the shaft for the adjacent roll 33. In the arrangement shown and described, each shaft 48 drives one of the rolls 32, which through the gear 32a and adjacent pinion 52 drives one of the rolls 33.

Figures 6, 7, 8:
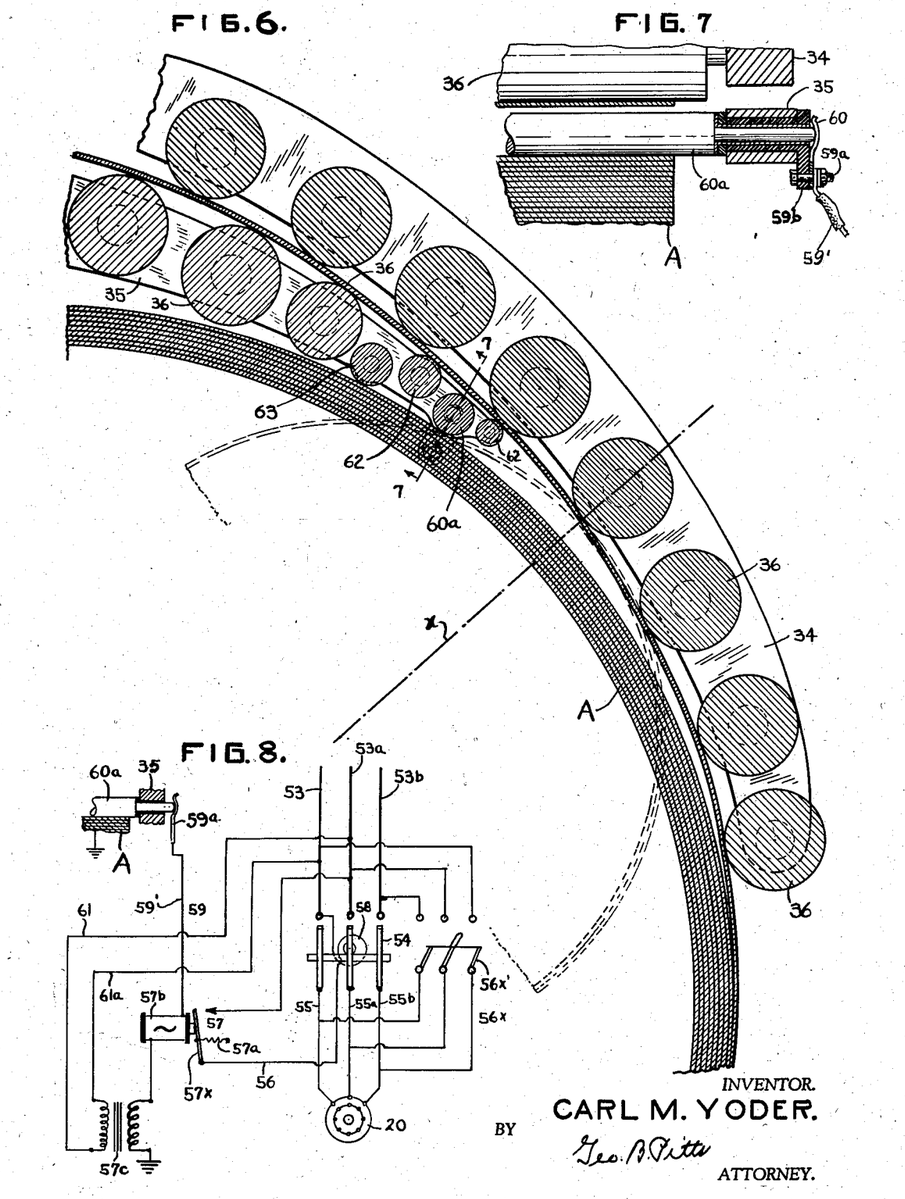
Fig. 6 is a fragmentary section on the line 2—2 of Fig. 1, enlarged.
Fig. 7 is a section on the line 7—7 of Fig. 6.
Fig. 8 is a diagrammatic view.

The means for automatically controlling the upward movement of the coil A on the standards 10, 10a, to maintain its outer convolution a at the point of lead-off in co-operative relation to the guide means 2, comprise the following electrical instrumentalities, reference being had particularly to Figs. 6, 7 and 8: 53, 53a, 53b, indicate the current supply mains of a three-wire system connected to the contacts of a suitable normally open switch 54, the other contacts of the switch being connected by leads 55, 55a, 55b, respectively, to the motor 20 (see Fig. 8). 56 indicates a separate circuit connected to the mains 53, 53a, and controlled by a switch 57, the pivoted arm 57x of which is normally biased to closed position by a spring 57a. 58 indicates an electromagnet interposed in the circuit 56 and arranged, when its coil is energized, to close the switch 54 and operate the motor 20. The arm 57x of the switch 57 constitutes the armature of an electromagnet 57b the coil of which is connected in an auxiliary circuit 59, one side of the coil of the electro-magnet 57b being grounded through the secondary winding of a transformer 57c and the other side of the coil being connected by a lead 59' to a terminal 59a. The terminal 59a is mounted on a block of insulation material 59b, suitably fixed to one of the arms 35 (see Fig. 7). The terminal 59a is electrically connected by a resilient plate 60 to one end of a roller 60a, the adjacent end of which freely rotates in bearings mounted in the insulation block 59b, as shown in Fig. 7, the opposite end being similarly mounted on the other arm 35, to insulate the roller 60a from the frame of the machine. The primary winding of the transformer 57c is connected by leads 61, 61a, to the mains 53, 53a, respectively, to supply electrical energy to the auxiliary circuit 59 when the latter is closed. As shown in Fig. 8, the coil of material A is grounded through the machine, so that when the coil is moved upwardly into engagement with the roller 60a, the auxiliary circuit 59 is closed, the effect of which is to energize the coil of the electro-magnet 57b and operate the switch 57 to the position shown in Fig. 8 and thus open the separate circuit 56. The opening of the circuit 56 will effect de-energization of the coil of the electro-magnet 58, thereby permitting the switch 54 to open and stop the operation of the motor 20. The motor 20 will remain stationary so long as the coil A remains in engagement with the roller 60a (see Fig. 6), but due to unwinding of the material from the coil and decrease in the diameter thereof, the coil will become disengaged from the roller 60a and hence break or open the circuit 59, and opening of the circuit 59 will effect de-energization of the coil of the magnet 57b and thus permit the spring 57a to operate the switch arm 57 and close the circuit 56, which in turn will cause operation of the electro-magnet 58 and closing of the switch 54 to start the motor 20 whereby the blocks 15 will be moved upwardly to effect re-engagement of the coil with the roller 60a, and thereby effect the closing of the circuit 59 and stoppage of the motor 20. By reason of these cycles of operation, the movement of the coil A upwardly on the line $x$ (Fig. 6) is controlled so as to maintain the lead-out portion of the material in operative relation to the guide means 2, until substantially the entire length of the material is uncoiled, as indicated in dotted lines in Fig. 6.

62, 62, indicate supplemental guide rollers, formed of insulating material, supported by the arms 35 and disposed forward and rearward of the roller 60a and in a plane outwardly of the latter roller, to guide that portion of the material feeding from the coil A to the sets of rolls 36 and to prevent contact of such material with the roller 60a. 63 indicates an auxiliary roller, formed of insulating material, also carried by the arms 35 and disposed in front of the outermost guide roller 36 thereon, and below or inward of the periphery of said roller, to prevent contact of the coil with this guide roller 36. The roller 63 is thus co-operatively related to the contact or circuit control roller 60a to guide the coil away from the adjacent rollers 36 at all times so that the coil cannot engage these rollers and effect operation of the motor 20.

For the purpose of operating the motor 20 to move the blocks 15 in the ways 14 independently of the uncoiling operation, for example, downwardly when a new coil A is to be engaged by the drum 17, I provide a supplemental circuit 56x controlled by a suitable switch 56x' which may be operated to effect operation of the motor 20 in the reverse direction. The switch 54 may be manually operated to close the circuit for the motor 20 and move the blocks 15 upwardly to position the coil for uncoiling.

Figures 9, 10, 11, 12:
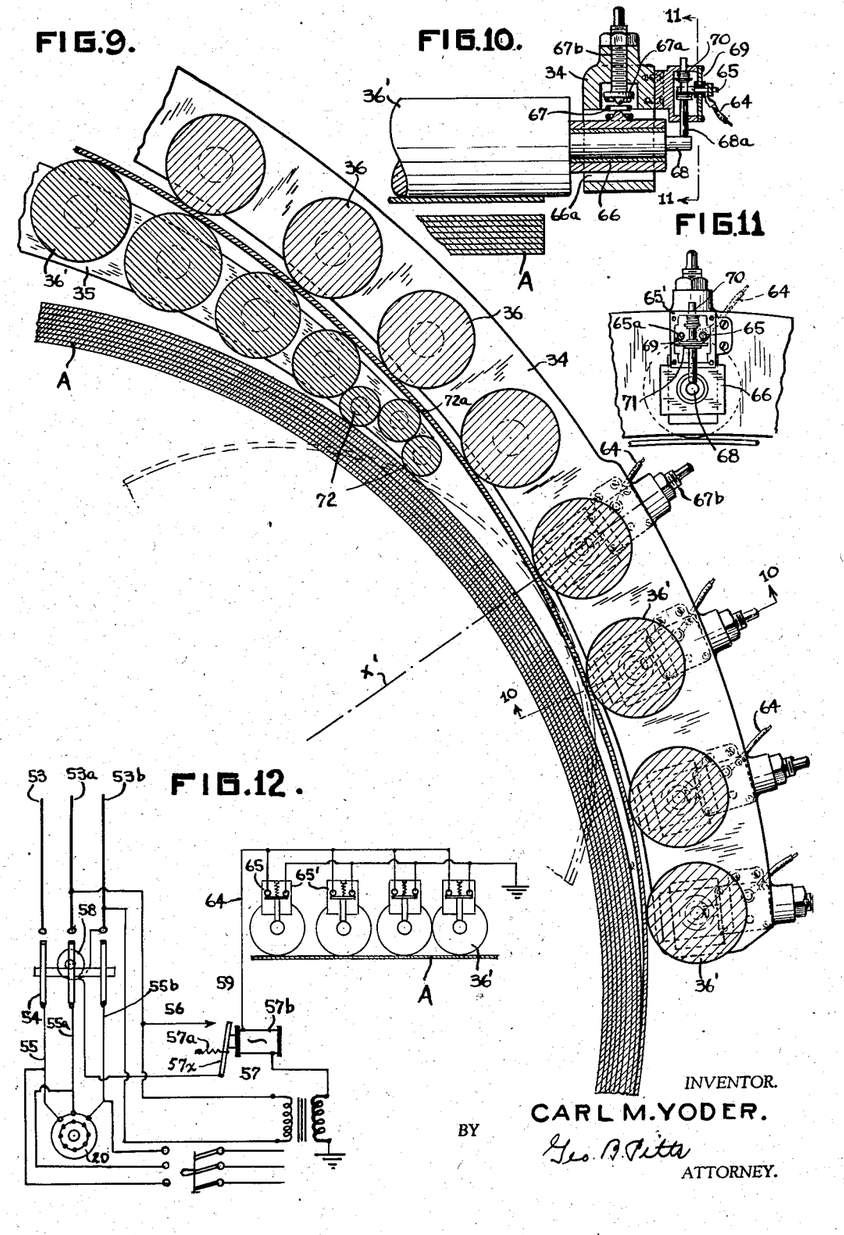
Fig. 9 is a view substantially similar to Fig. 6, but showing a modified form of construction.
Fig. 10 is a fragmentary view on the line 10—10 of Fig. 9.
Fig. 11 is a view on line 11—11 of Fig. 10.
Fig. 12 is a diagrammatic view.

Figs. 9, 10, 11 and 12 illustrate a modified form of control means for the motor 20 wherein the movement of one or more guide rolls (indicated at 36') on the arms 34, due to contact with or pressure of the material thereon, in feeding from the coil, serves to operate the arm 57x of the switch 57 and close the auxiliary circuit 59, the effect of which is to stop the motor in the manner already described in connection with Figs. 6, 7 and 8, and disengagement of the material from the roll or rolls serves to release the arm 57x and close the circuit 56 and start the motor 20 and thereby move the coil upwardly along the line x' (Fig. 9). In this form of construction, the operation of the motor 20 is started and stopped, to maintain the outer coil convolution substantially in a predetermined position, by the operation of the normally open switch 54, which controls the flow of current from the leads 53, 53a, 53b, to the leads 55, 55a, 55b, the electromagnet 58 serving to operate the switch 54 to closed position. The coil of the electro-magnet 58 is connected in the separate circuit 56 and is energized and de-energized by the operation of the normally closed switch 57. When the coil of the electro-magnet 57b is energized by the closing of the auxiliary circuit 59, the arm 57 breaks the circuit 56. The electrical operating means diagrammatically shown in Fig. 12 does not differ from that shown in Fig. 8, except that one lead 64 from the coil of the electro-magnet 57b is connected to one terminal 65 of each of the switches 65', the other terminals 65a thereof being grounded as shown in Fig. 12, so that the machine is not included in the auxiliary circuit. As will be understood from Figs. 10 and 11, the opposite ends of the rollers 36' are mounted in bearing boxes 66 which slidably engage the side walls of alined openings 66a formed in the arms 34. The material A, as it feeds from the coil, serves to exert outward pressure on one or more of the rollers 36', against the tension of compression springs 67 interposed between the adjacent bearing boxes 66 and abutments 67a therefor provided on the inner ends of screws 67b, the screws being threaded through openings formed in the arms 34, whereby the abutments may be adjusted to increase or decrease the tension of the springs 67. At one end each roller 36' is provided with an axially extending pin 68 which is arranged to be engaged by a plunger 68a.

Each plunger 68a is guided endwise in openings formed in the top and bottom walls of a box 69 suitably bolted to the outer side of the adjacent arm 34, the box having an outer, removable side wall which supports the adjacent contacts 65, 65a (see Figs. 10 and 11). The plunger is biased downwardly and normally maintained in engagement with the pin 68 by a spring 70 coiled around the plunger and interposed between the top wall of the box 69 and a collar fixed to the plunger. Intermediate its ends the plunger 68a is provided with a contact plate 71 which, upon upward movement of the plunger, engages the contacts 65, 65a, to close the auxiliary circuit 59. As shown in Fig. 12, the switches 65' are connected in parallel in the auxiliary circuit 59 so that outward movement of any one of the rollers 36', due to the engagement of the material therewith, will effect closing of the circuit 59 and opening of the circuit 56, the effect of which is to stop the motor 20. As the material uncoils, the decreasing diameter of the coil will effect a disengagement of the lead-off portion of the material from the rollers 36', thereby breaking the auxiliary circuit 59 and permitting the spring 57x to close the separate circuit 56, which in turn energizes the coil 58 and closes the motor circuit, whereby the operating means 19 will move the coil upward, along the line x' (see Fig. 9) until the lead-off portion of the material re-engages one or more of the rollers 36' and again stops the motor 20.

In this modified form, I prefer to provide on the outer end portions of the arms 35 two rollers 72 formed of insulation material, arranged to engage the coil and prevent engagement thereof with the adjacent guide rollers 36' on the arms 35 and a roller 72a formed of insulation material between the rollers 72 arranged to guide the lead-off portion of the material into position between the series of guide rollers.

Figure 1:
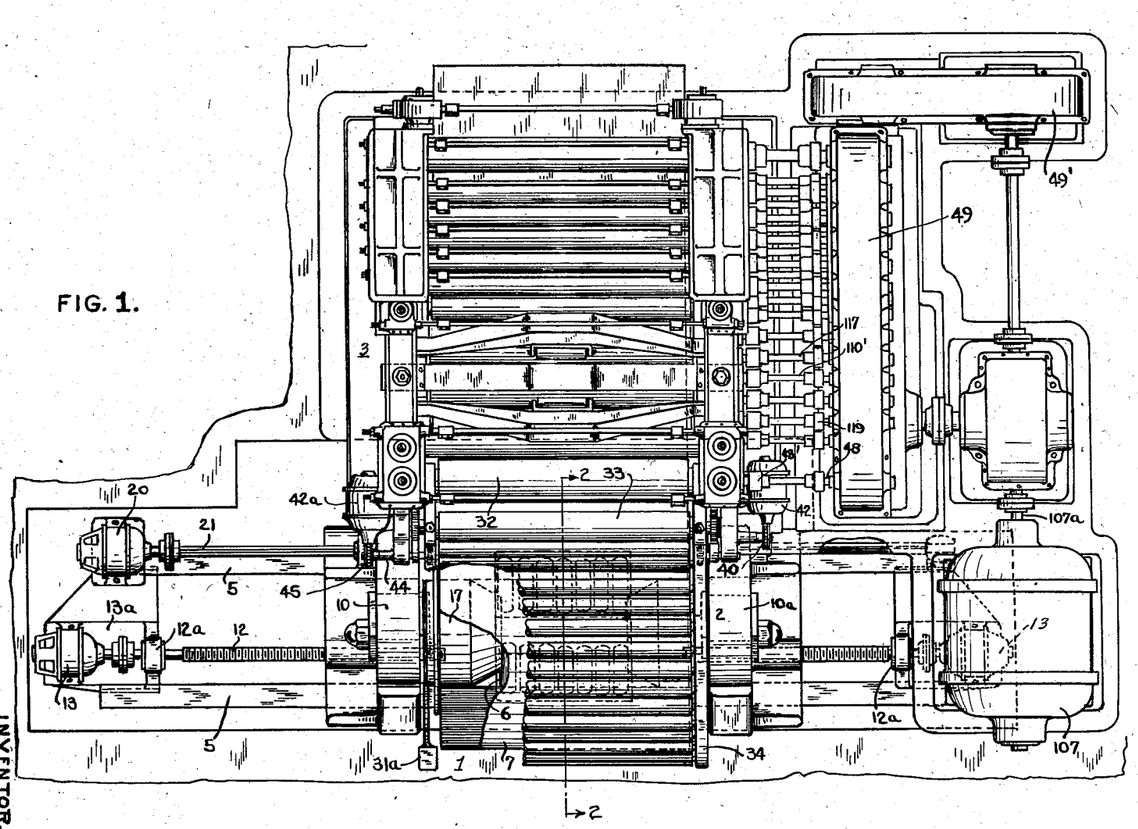
Fig. 1 is a plan view of an apparatus having an uncoiling mechanism embodying my invention.
Figure 5:
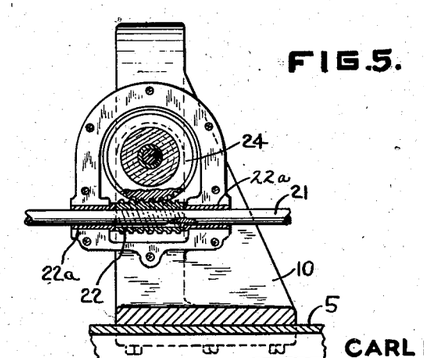
Fig. 5 is a section on the line 5—5 of Fig. 4.

73 indicates a guide roller rearward of the feed rolls 32 and arranged to guide the material downward to the mechanism 3. The guide roller 73 is mounted in bearing boxes 73a. The bearing boxes 73a and the boxes 46, 46a, for the upper feed rolls 32, 33, respectively, are adjustable vertically. For this purpose, each of these boxes is provided on its upper side with an inverted hollow member 74 into which projects a rod 74a having a head rotatably fitting the walls of the hollow member (see Fig. 3). Each of the rods 74a for the boxes 46 and 73a extends through an opening formed in a bridge member 76 and has screw threaded engagement therewith, the upper end of the rod being splined to a worm gear 77 in mesh with a worm on a shaft 78, so that when the latter is rotated the adjacent rods 74a are moved upwardly or downwardly. As each shaft 78 is common to the adjacent worm gears 77, it will be seen that when the shaft is operated, both boxes 46 or 73a related thereto will be moved. Each shaft 78 at one or both ends is shaped to receive a suitable tool for rotating it, although when desirable power means may be provided for rotating the shaft. As shown in Figs. 1, 2 and 5, the worm gears 77 and worms are enclosed in suitable casing members. The rod 74a for each of the boxes 46a has screw threaded engagement with a nut 75, so that by rotating the rod and holding the nut stationary the boxes 46a may be raised or lowered.

The mechanism 3 may be of any desired construction. As such mechanism forms no part of the present invention, further illustration and description thereof are omitted.

Figure 13:
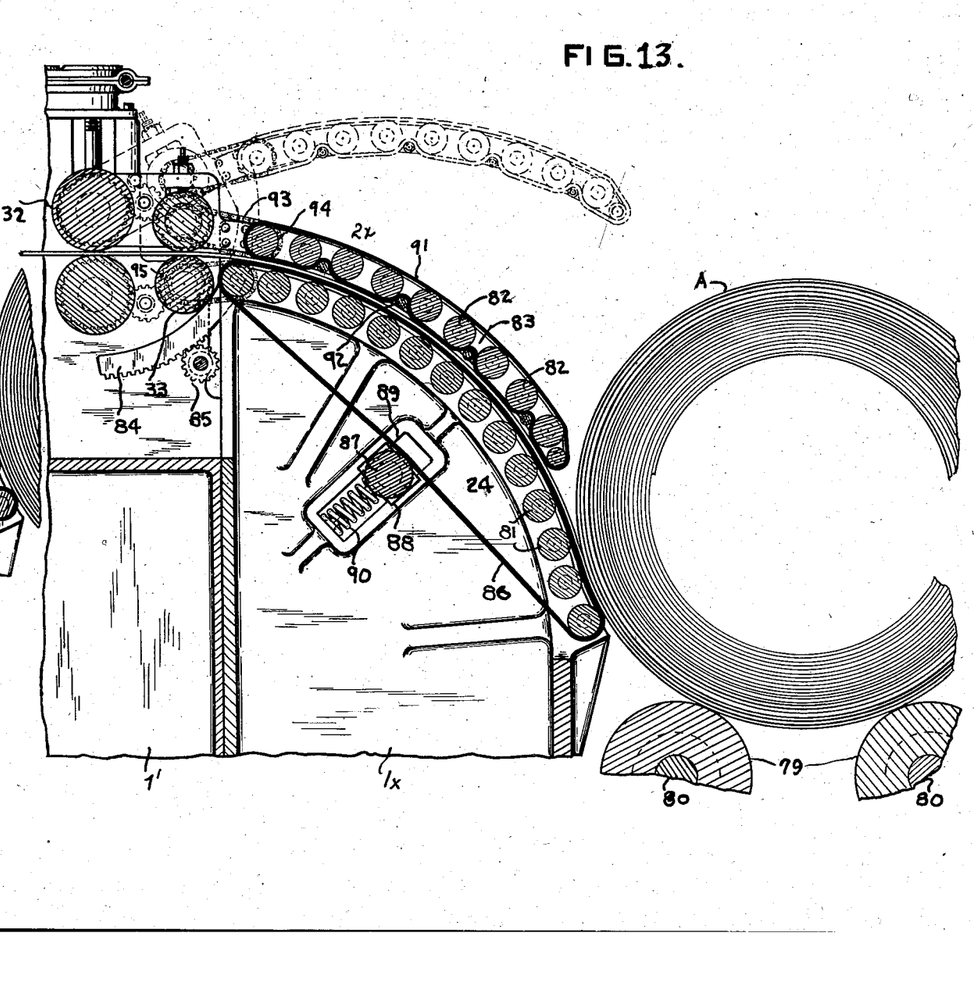
Figs. 13, 14 and 15 are fragmentary sectional views illustrating modifications.
Figure 14:
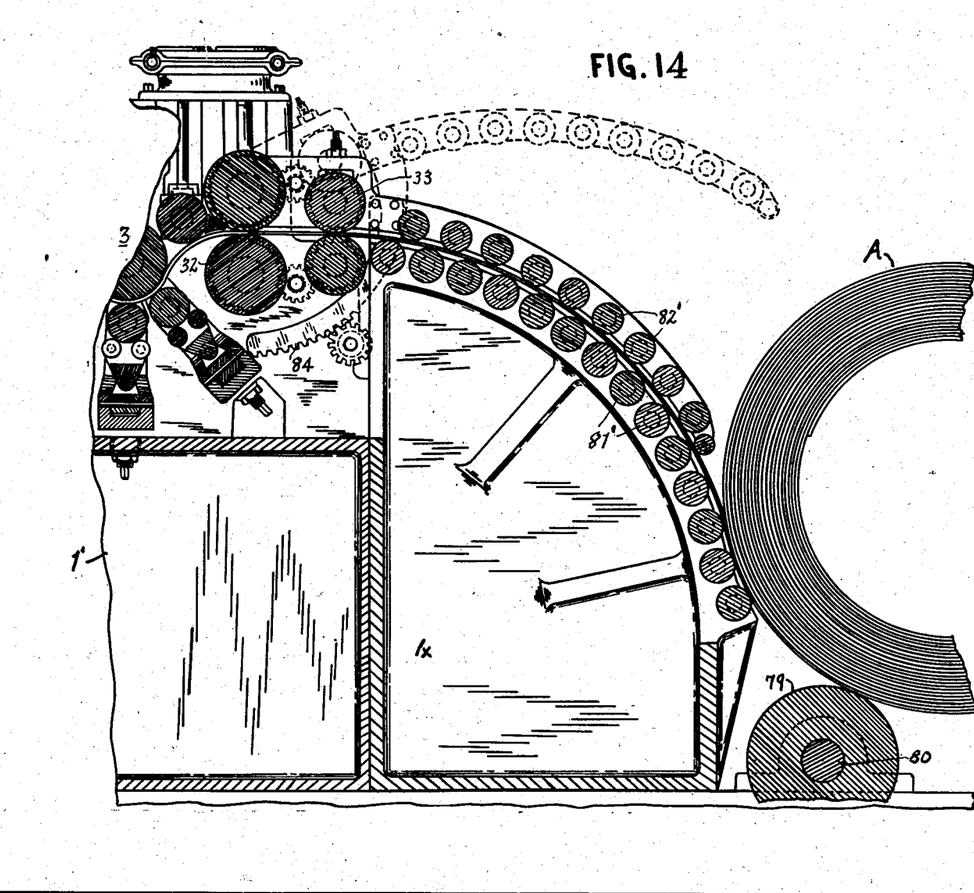
Figure 15:
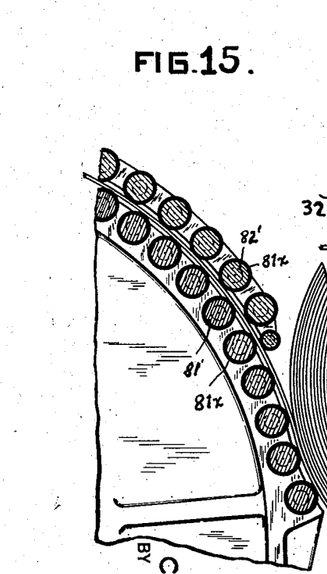

Figs. 13, 14 and 15 illustrate modified forms of construction, wherein the material leaves the coil from the under side thereof. Referring to Fig. 13, the coil A is mounted on a pair of rolls 79 which freely rotate on suitably supported shafts 80, whereby the coil may rotate due to the uncoiling of the material therefrom, the material being drawn from the coil by the feed rolls 32, 33, which are driven in the manner already set forth. The guide means, indicated as an entirety at 2x, are of arc or curvilinear shape, and extend from a point adjacent the underside of the coil to the feed rolls 33. In this form of construction the lower series of rolls 81 are loosely mounted at their opposite ends in auxiliary side frames 1x (only one being shown) and preferably extend to a point beyond that from which the material leaves the coil A. The auxiliary frames 1x are spaced apart a distance to provide rolls 81 having a length slightly greater than the maximum width of material for which the machine 3 is adapted to operate on. The upper series of rolls 82, which correspond in length to the rolls 81, are loosely mounted at their opposite ends on a pair of arms 83, which are pivoted at their inner ends on the end portions of the shaft for the upper feed roll 32. The arms 83 are provided with arc-shaped racks 84, which are in mesh with pinions 85 driven in the manner already set forth, whereby the arms 83 may be moved to an in-operative position, as shown in dotted lines. 86 indicates an endless conveyor extending around the series of rolls 81, the upper run of the conveyor being in engagement therewith, whereas its lower run engages with a roller 87. The roller 87 is suitably mounted at its opposite ends in bearing boxes 88, which are slidably mounted in ways 89 provided in the side frames 1x. The boxes 88 are engaged by expansion springs 90, which normally act on the boxes to bias the roller 87 outwardly to maintain the conveyor taut. 91 indicates an endless conveyor extending around the series of rolls 82, its inner run co-operating with the upper run of the conveyor 86 to form a guide for the material. By preference, the conveyors 86 and 91 have a width substantially equal to the length of the rolls 81 and 82. For the purpose of maintaining the inner run of the conveyor 91 in engagement with the peripheries of the rolls 82, I provide on the arms 83 freely rotatable guide rolls 92, each of which is of a size to fit between two adjacent rolls 82 (with its inner periphery inwardly of the imaginary arc formed by the inner peripheries of the rolls 82) and guides the conveyor 91 around its inner side, the effect of which is to maintain the conveyor 91 in engagement with the adjacent rolls 82. The guide rolls 92 are arranged in alternate spaces between the rolls 82, which arrangement insures engagement of the conveyor with each roll 82. Each of the conveyors 86, 91, is preferably formed of a material, such as rubberized fabric, which eliminates danger of scratching or otherwise damaging the material. As the series of rolls 81, 82, are disposed in arcuate concentric relation and support the adjacent conveyor runs on their opposed peripheries, they define a correspondingly shaped guide for the material. The innermost roll of each series of rolls 81, 82, is driven to impart movement to the adjacent conveyor, so that the conveyors 86, 91, constitute a traveling guide from the coil A to the feed rolls 33. The drive for each inner roll 81, 82, consists of an endless chain 93 engaging a sprocket 94 on one end of the roll shaft and a sprocket 95 on the corresponding end of the shaft for the adjacent feed roll 33. As the sprockets 94 and 95 are of similar size, the runs of the conveyors have a speed of movement corresponding to the speed of the peripheries of the feed rolls 33, to eliminate any differential movement between the conveyors and the feed rolls.

In the form of construction shown in Fig. 14, I provide series of freely rotatable rolls 81', 82', mounted similarly to the rolls 81, 82, respectively, but spaced in closed relation, as compared to the spacing of the series of rolls shown in Fig. 13, so that the opposed peripheries of the rolls form the guide-way for the material.

Fig. 15 illustrates a form of construction similar to that shown in Fig. 14, wherein rolls 81', 82', are surfaced with suitable material, such as rubber, 81x to avoid scratching or marring the material.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. In apparatus of the character described, the combination with a pair of feed rolls adapted to be related to mechanism for operating on sheet material, of arcuate guiding and supporting means with which the material engages during uncoiling thereof from a coil, the inner end of said guide means being related to said feed rolls, and means mounted below and within the arc of said guide means for supporting a coil of material with the lead-off portion of its outer convolution related to the outer end of said guide means for delivery thereto, the material having engagement with the guide means from the coil to said feed rolls and contiguous portions of said guide means having a gradually decreasing curvature from the coil to said rolls to gradually transform the material into rectilinear shape.

2. An apparatus as claimed in claim 1 wherein the guide means comprise upper and lower sets of devices, the devices of each set being arranged in side-by-side relation and disposed on an arc of gradually decreasing curvature from the coil to said feed rolls and co-operating with the devices of the other set to guide the material and gradually transform it into rectilinear shape.

3. An apparatus as claimed in claim 1 wherein the guide means comprise upper and lower sets of rolls, the rolls of each set being disposed in side by side relation on an arc and substantially parallelly related to the other set of rolls, to form a guide-way for the material.

4. In apparatus of the character described, the combination with a pair of feed rolls adapted to be related to mechanism for operating on sheet material, of supporting means for a coil of sheet material, and guide means extending from the lead-off position of the convolutions of the coil to said feed rolls, for guiding the material to said rolls, said guide means comprising upper and lower sets of rolls, the rolls of each set being disposed in side by side relation on an arc in concentric relation to the other set of rolls, and endless belts engaging the end rolls of said sets, respectively, and having runs disposed between said sets of rolls for forming a guide-way for the material, the length of said rolls and width of said belts being co-extensive with the width of the sheet material.

5. In apparatus of the class described, the combination with a support, feed rolls thereon adapted to be related to a mechanism for operating on sheet material, of supporting means for a coil of material movably mounted on said support, curvilinear guide means having its inner end related to said feed rolls and extending outwardly therefrom, the outer end of said guide means being arranged to engage the outer convolution of the coil as it unwinds from the latter and guide the material to said feed rolls, and means for moving the coil toward said guide means to maintain the lead-off portion of its outer convolution during unwinding of the coil in a substantially predetermined relation to the outer end of said guide means for delivery thereto.

6. An apparatus as claimed in claim 5 wherein said moving means comprises a motor and means responsive to the decrease in diameter of the coil during uncoiling thereof for operating said motor.

7. In apparatus of the class described, the combination with a support, feed rolls thereon adapted to be related to a mechanism for operating on sheet material, of supporting means for a coil of material movably mounted on said support, curvilinear guide means having its outer end related to and extending from the outer convolution of the coil of material to said feed rolls, and means for moving the coil toward said guide means to maintain the lead-off portion of its outer convolution during unwinding of the coil in a substantially predetermined relation to the outer end of said guide means, said moving means comprising a motor and means, including devices movably mounted on said guide means, dependent on the decrease in diameter of the coil of material for operating said motor.

8. An apparatus as claimed in claim 1 wherein the guide means comprise upper and lower curvilinear devices disposed in parallel relation to form between them a guide extending from the lead-off position of the convolutions of the coil to said feed rolls, one of said devices consisting of a set of rolls.

9. In apparatus of the class described, the combination with a support, feed rolls thereon adapted to be related to a mechanism for operating on sheet material, of means for supporting a coil of material, and guide means between the coil and said feed rolls, comprising a curvilinear support extending from the lead-off portion of the coil to said feed rolls, an endless conveyor having a run guided by said curvilinear support from end to end thereof, side-by-side related devices arranged curvilinearly and substantially parallel to said conveyor run and means for driving said conveyor.

10. In apparatus of the class described, the combination with supporting means, feed rolls mounted thereon and adapted to be related to a mechanism for operating on sheet material, of a support for a coil of material, movably mounted on said supporting means, a curvilinear guide on said supporting means extending from the outer convolution of the coil to said feed rolls, means including a motor, a circuit for the motor and a switch in said circuit for moving said support to move the coil toward said guide to position its outer convolution in delivery relation to the latter, and a spring operated device operatively connected to said switch and movably mounted on said guide and arranged to engage the outer convolution of the coil, said device serving to operate the switch and close the circuit to operate said motor due to decrease in diameter of the coil during uncoiling thereof to move the coil toward said guide and to operate the switch to open the circuit when the outer convolution of the coil is in delivery relation to said guide.

11. In apparatus of the class described, the combination with a support, feed rolls thereon adapted to be related to a mechanism for operating on sheet material, of means for supporting a coil of sheet material, curvilinear guide means having its inner end related to said feed rolls and its outer end disposed to engage the outer convolution of the coil as it unwinds from the latter, said guide means forming a support for the material from the coil to said feed rolls, said supporting means comprising guides and slidable devices in said guides in supporting engagement with the coil, and means responsive to the decrease in diameter of the coil during uncoiling thereof for moving said devices toward said guide means to maintain the lead-off portion of the outer convolution of the coil during unwinding thereof in a substantially predetermined relation to the outer end of said guide means.

12. An apparatus as claimed in claim 11 wherein said moving means comprise a motor and means, including devices movably mounted on said guide means arranged to be engaged and operated by the material for controlling the operation of said motor.

13. In apparatus of the class described, the combination with a support, and feed rolls thereon adapted to be related to a mechanism for operating on sheet material, of movably mounted supporting means for a coil of sheet material, guide means for the material extending from the outer convolution of the coil to said feed rolls, said guide means comprising upper and lower pairs of curvilinear arms supported on said support and a set of rolls rotatably supported at their opposite ends in each pair of arms, each set forming with the other set of rolls a guide for the material, and means for moving said supporting means toward said guide means for maintaining the outer convolution of the coil, during uncoiling thereof, in delivery relation to the outer end of said guide means.

14. An apparatus as claimed in claim 13 wherein said moving means includes a motor and devices controlled by the material for operating said motor.

15. In apparatus of the character described, the combination with a pair of feed rolls adapted to be related to mechanism for operating on sheet material, of supporting means for a coil of sheet material, means extending between and related at its opposite ends to the lead-off position of the convolutions of the coil and said feed rolls, for supporting the material and transforming it into rectilinear shape during feeding thereof to said rolls, said supporting means comprising upper and lower sets of rolls, the rolls of each set being disposed in side by side relation on an arc in substantially concentric relation to the other set of rolls, endless belts engaging the end rolls of said sets, respectively, and having runs disposed between said sets of rolls for forming a guide-way for the material, and means for driving one end roll of each set of rolls.

16. An apparatus as claimed in claim 15 wherein are provided guide devices related to the rolls of the upper set to maintain the adjacent belt run in engagement therewith.

17. In apparatus of the class described, the combination with supporting means and a pair of feed rolls thereon adapted to be related to a mechanism for operating on sheet material, of a movable support on said supporting means for a coil of sheet material, a guide having its inner end related to said feed rolls and its outer end disposed to engage the lead-off portion of the outer convolution of the coil as it unwinds therefrom, said guide means forming a support for the material from the coil to said feed rolls and said movable support being arranged to initially support the coil with the lead-off portion of its outer convolution in delivery relation to the outer end of said guide, and means for moving said support step-by-step to maintain the lead-off portions of the succeeding outer convolutions of the coil in delivery relation to the outer end of said guide.

18. In apparatus of the class described, the combination with a support and a pair of feed rolls thereon adapted to be related to a mechanism for operating on sheet metal, of a guide on said support having its inner end related to said feed rolls, supporting means on said support for a coil of sheet metal, arranged to initially support the coil with the lead-off portions of its outer convolution in delivery relation to the outer end of said guide, said supporting means comprising guide-ways on said support extending in a plane at substantially right angles to the tangential plane cutting the lead-off of the material from the coil and devices slidable in said guide-ways and engaging the opposite ends of the coil, and means for moving said devices step-by-step to maintain the lead-off portions of succeeding outer convolutions of the coil in delivery relation to the outer end of said guide.

19. An apparatus as claimed in claim 17 wherein is provided on said guide a device actuated by the decrease in diameter of the coil due to uncoiling of the material therefrom, for controlling the operation of said moving means.

20. In apparatus of the class described, the combination with a support and feed rolls thereon adapted to be related to a mechanism for operating on sheet metal, of supporting means for a coil of the material movably mounted on said support, a guide for the material comprising upper and lower members mounted on said support, the outer end of said guide being related to the lead-off position of the convolutions of the coil, means dependent on the decreasing diameter of the coil for moving said supporting means toward said guide to maintain its outer convolution in a substantially predetermined relation to the outer end of said guide, said moving means including a device mounted on said lower member for controlling the operation of said moving means, and a guide element on said lower member for maintaining the material during delivery thereof from the coil out of engagement with said device.

21. In apparatus of the class described, the combination with a support and feed rolls thereon adapted to be related to a mechanism for operating on sheet metal, of supporting means for a coil of the material movably mounted on said support, a guide for the material comprising upper and lower concentrically related members mounted on said support, the outer end of said guide being related to the lead-off position of the convolutions of the coil, means for moving said supporting means toward said guide to maintain the outer convolution of the coil in a substantially predetermined relation to the outer end of said guide, said moving means including a motor, a source of current supply, a circuit for said motor connected to said source of current supply, and means responsive to the decrease in diameter of the coil for closing and opening said circuit to control the operation of said motor.

22. An apparatus as claimed in claim 1 wherein the support for the coil is movable and means are provided for moving the coil support toward and from the outer end of said guide means.

23. In an apparatus of the class described, the combination with a support and a pair of feed rolls adapted to be related to mechanism for operating on sheet material, of arcuate guide means related at their inner end to said rolls, and means for supporting a coil of sheet material in operative relation to the outer end of said guide means, said guide means comprising an inner set of rollers arranged in side-by-side relation on an arc, a pair of spaced arcuate shaped arms and a set of rollers rotatably mounted in said arms in side-by-side relation in concentric relation to said first mentioned set of rollers, said arms being pivotally mounted at their inner ends on said support and swingable away from said first mentioned set of rollers.

CARL M. YODER.